United States Patent
Lee

(10) Patent No.: US 7,427,154 B2
(45) Date of Patent: Sep. 23, 2008

(54) BACKLIGHT ASSEMBLY INCLUDING INVERTER FOR LIQUID CRYSTAL DISPLAY DEVICE

(75) Inventor: Jeong-Geun Lee, Daegu (KR)

(73) Assignee: LG Display Co., Ltd., Seoul (KR)

( * ) Notice: Subject to any disclaimer, the term of this patent is extended or adjusted under 35 U.S.C. 154(b) by 169 days.

(21) Appl. No.: 11/148,560

(22) Filed: Jun. 9, 2005

(65) Prior Publication Data

US 2006/0061982 A1     Mar. 23, 2006

(30) Foreign Application Priority Data

Sep. 23, 2004    (KR)   ................ 10-2004-0076581

(51) Int. Cl.
     *F21V 7/04*      (2006.01)
(52) U.S. Cl. .................. 362/631; 362/630; 362/632; 362/362
(58) Field of Classification Search ................ 315/184, 315/276, 274, 277, 279, 282, 291, 307, 209 R, 315/211, 220, 217, 224, 225, 312, 322, 323, 315/324, 185 R, 189, 55–59; 362/600–608, 362/630–634, 362–375, 217, 219, 220, 222, 362/223, 646, 360, 361, 647
See application file for complete search history.

(56) References Cited

U.S. PATENT DOCUMENTS

| | | | |
|---|---|---|---|
| 6,979,957 B2 * | 12/2005 | Lee et al. | 315/195 |
| 2002/0130628 A1 * | 9/2002 | Shin | 315/312 |
| 2005/0213312 A1 * | 9/2005 | Kwon | 362/29 |
| 2005/0225514 A1 * | 10/2005 | Ahn et al. | 345/75.2 |
| 2006/0038508 A1 * | 2/2006 | Lin et al. | 315/276 |

FOREIGN PATENT DOCUMENTS

| KR | 1020030031406 A | 4/2003 |
|---|---|---|
| KR | 1020040104117 A | 12/2004 |

* cited by examiner

*Primary Examiner*—Tuyet Vo
(74) *Attorney, Agent, or Firm*—McKenna Long & Aldridge LLP

(57) ABSTRACT

A backlight assembly for a display device includes a plurality of lamps supplying light to the display device, each lamp having first and second electrodes, and an inverter including a plurality of transformers electrically connected to each of the plurality of lamps, a first number amount of the plurality of transformers is equal to or less than a second number amount of the plurality of lamps.

21 Claims, 6 Drawing Sheets

BACKLIGHT ASSEMBLY INCLUDING INVERTER FOR LIQUID CRYSTAL DISPLAY DEVICE

The present invention claims the benefit of Korean Patent Application No. 2004-0076581, filed in Korea on Sep. 23, 2004, which is hereby incorporated by reference.

BACKGROUND OF THE INVENTION

1. Field of the Invention

The present invention relates to a liquid crystal display device, and more particularly, to a backlight assembly for a liquid crystal display (LCD) device. Although the present invention is suitable for a wide scope of applications, it is particularly suitable for reducing the numbers of the transformers and the driving circuits for the transformers in the backlight assembly for the LCD device.

2. Discussion of the Related Art

Until recently, cathode-ray tubes (CRTs) have been typically used in display devices. Presently, many efforts are being made to study and develop various types of flat panel displays, such as liquid crystal display (LCD) devices, plasma display panels (PDPs), field emission displays (FED), and electro-luminescence displays (ELDs), as a substitute for CRTs. In particular, these types of flat panel displays have been driven as an active matrix type in which a plurality of pixels arranged in a matrix form are driven by a plurality of thin film transistors therein. Among the active matrix types of flat panel displays, liquid crystal display (LCD) devices have been widely used as monitors for notebook computers and desktop computers because of their high resolution, ability to display colors and superiority in displaying moving images.

In general, an LCD device includes two substrates that are spaced apart and face each other with a liquid crystal material interposed between the two substrates. The two substrates include electrodes that face each other such that a voltage applied between the electrodes induces an electric field across the liquid crystal material. Alignment of the liquid crystal molecules in the liquid crystal material changes into the direction of the induced electric field in accordance with the intensity of the induced electric field into the direction of the induced electric field, thereby changing the light transmissivity of the LCD device. Thus, the LCD device displays images by varying the intensity of the induced electric field. Since the LCD devices are non-luminous type display devices, the LCD devices require a backlight assembly for supplying light.

The backlight assembly is categorized as an edge type backlight assembly or a direct type backlight assembly according to the arrangement thereof. A lamp of the edge type backlight assembly is disposed at side portions of the LCD device, while a lamp of the direct type backlight assembly is disposed at the rear of the LCD device. As size of the LCD device gets larger, a higher luminance backlight is required. The direct type backlight assembly is more widely used because of its ability to provide higher luminance.

FIG. 1A is a schematic plan view of a direct type backlight assembly of the LCD device according to the related art. As shown in FIG. 1A, the backlight assembly includes a plurality of U-shaped lamps 110, a lamp housing 120 accommodating the U-shaped lamps 110 therein, and an inverter 100. The inverter 100 includes a conversion circuit (not shown) converting a direct current (DC) voltage to an alternating current (AC) voltage, a plurality of transformers 130 boosting the converted AC voltage, and a plurality of output connectors 140 supplying the boosted AC voltage to the U-shaped lamps 110. Each U-shaped lamp 110 is connected to the two corresponding transformers 130 through the corresponding connector 140.

FIG. 1B is a waveform diagram of lamp driving voltages input to the U-shaped lamp of FIG. 1A. As shown in FIG. 1B, first and second lamp driving voltages "WF1" and "WF2" are alternately output from the transformers 130 (shown in FIG. 1A) and thus are supplied respectively to the two electrodes of each U-shaped lamp 110 (shown in FIG. 1A). The first and second lamp driving voltages have inverse phases to each other, i.e., 180 degrees, and thus a center portion of each U-shaped lamp 110 acts as a virtual ground 111. Since the adjacent lamp driving voltages "WF1" and "WF2" have inverse phases, the wave noise of the LCD device is improved.

FIG. 2 is a schematic circuit diagram of a driving circuit for a transformer according to the related art. As shown in FIG. 2, the driving circuit includes a switching portion 230, a controlling portion 220, a voltage detecting portion 210 and a feed-back line 240. The driving circuit is connected to each transformer 250. The voltage detecting portion 210 outputs a feed-back signal to the controlling portion 220 through the feed-back line 240. The switching portion 230 selects voltages output from a voltage source in response to a controlling signal of the controlling portion 220. The controlling portion 220 controls the switching portion 230 in response to a feed-back signal of the voltage detecting portion 210.

The transformer 250 includes a primary winding 251 and a secondary winding 252. Both terminals of the primary winding 251 are connected to the switching portion 230. One terminal of the secondary winding 252 is connected to an U-shaped lamp 200, and the other terminal of the secondary winding 252 is connected to the voltage detecting portion 210. Accordingly, the voltage detecting portion 210 outputs the feed-back signal corresponding to a voltage of the other terminal of the secondary winding 252.

The above related art backlight assembly uses two transformer to drive each U-shaped lamp. Therefore, as the number of the U-shaped lamps increases, the numbers of the transformers and the driving circuits for the transformers also increase. The increasing numbers of transformers and the driving circuits for the transformers take up more space and add more weight.

SUMMARY OF THE INVENTION

Accordingly, the present invention is directed to a backlight assembly for a liquid crystal display device that substantially obviates one or more of problems due to limitations and disadvantages of the related art.

An object of the present invention is to provide a backlight assembly for a liquid crystal display device that can reduce the numbers of the transformers and the driving circuits for the transformers.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a backlight assembly for a display device includes a plurality of lamps supplying a light to the display device, each lamp having first and second electrodes; and an inverter an inverter including a plurality of transformers electrically connected to each of the plurality of lamps, a first number amount of the plurality of transformers is equal to or less than a second number amount of the plurality of lamps.

In another aspect of the present invention, a backlight assembly for a display device includes a plurality of lamps supplying a light to the display device, each lamp having first and second electrodes; and an inverter including a first transformer connected to the plurality of lamps.

In a further aspect of the present invention, a backlight assembly for a display device includes a plurality of lamps supplying light to the display device, each lamp having first and second electrodes, an inverter including at least one first transformer connected to the first electrodes of the plurality of lamps, a first number amount of the at least one first transformer is equal to or less than a second number amount of the plurality of lamps.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the illustrated embodiments of the present invention, which are illustrated in the accompanying drawings.

Figure 3A:
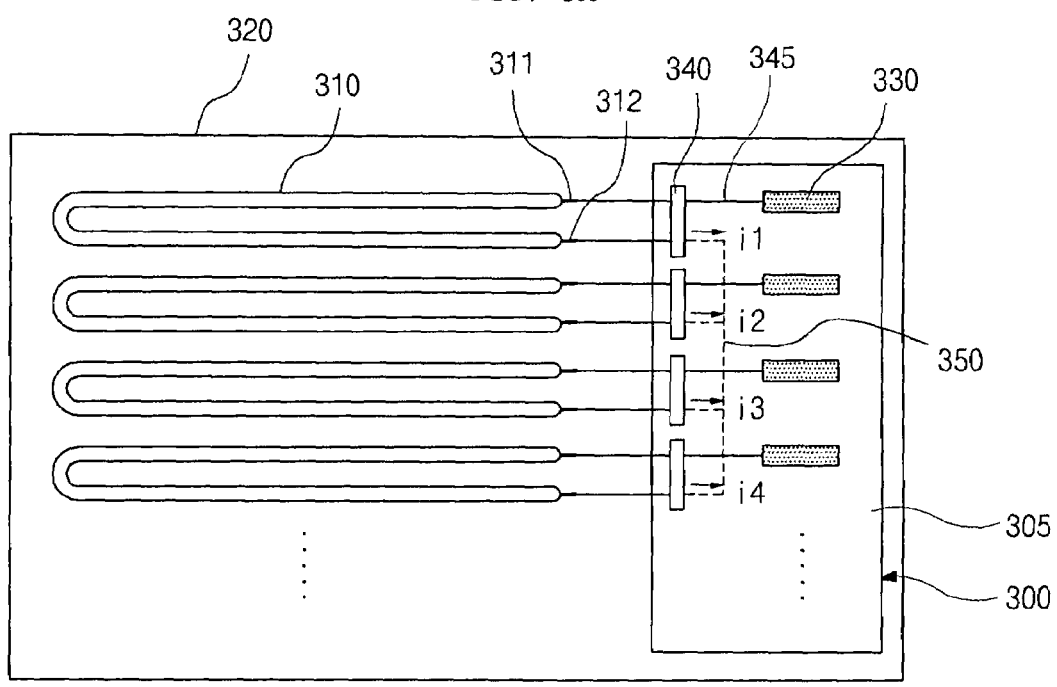
FIG. 3A is a schematic plan view of a direct type backlight assembly for the LCD device according to a first exemplary embodiment of the present invention.

FIG. 3A is a schematic plan view of a direct type backlight assembly for the LCD device according to a first exemplary embodiment of the present invention. As shown in FIG. 3A, the backlight assembly includes a plurality of U-shaped lamps 310, a lamp housing 320 accommodating the U-shaped lamps 310 therein, and an inverter 300 supplying lamp driving voltages to the U-shaped lamps 310. The U-shaped lamps 310 are arranged in parallel. A cold cathode fluorescent lamp (CCFL) may be used as the U-shaped lamp 310. Further, the lamp 310 may have other shapes such as a bar shape, instead of the U-shape. The backlight assembly including the above components is arranged below the LCD device and supplies light to the LCD device.

The inverter 300 includes a conversion circuit (not shown) converting a direct current (DC) voltage to an alternating current (AC) voltage, a plurality of transformers 330 boosting the converted AC voltage, and a plurality of output connectors 340 supplying the boosted AC voltage (i.e. lamp driving voltage) to the U-shaped lamps 310. The inverter 300 is formed on a printed circuit board (PCB) 305, where the above components of the inverter 300 are arranged and interconnected to one another. In particular, the components of the inverter 300 are interconnected by using metal patterns inside the PCB 305 and on outer surfaces of the PCB 305. The number of the transformers 330 coincide with the number of the U-shaped lamps 310 such that each transformer 310 is connected to each U-shaped lamp 310.

Each U-shaped lamp 310 is connected to the corresponding transformer 330 through the corresponding connector 340 and a corresponding metal pattern 345 on the front surface of the PCB 305. In other words, a first electrode 311 of each U-shaped lamp 310 is connected to the corresponding transformer 330 and is supplied with the corresponding lamp driving voltage output from the corresponding transformer 330. A second electrode 312 of each U-shaped lamp 310 is connected to a common line 350 through the connectors 340.

The lamp driving voltages output from the adjacent transformers 330 have inverse phases to each other. Accordingly, voltages applied in the adjacent U-shaped lamps have inverse phases to each other, and thus the wave noise of the LCD device can be prevented. Further, there may be relations of currents "i1", "i2", "i3", "i4", . . . flowing on the second electrodes 312 following a current-summation expression, i1+i2+i3+i4+ . . . =zero, thereby to drive the U-shaped lamp 310.

The first and second electrodes 311 and 312 respectively act as high and low voltage portions. If the high and low voltage portions are close to each other, a voltage difference therebetween causes interference (such as electric discharge). Accordingly, all of the second electrodes 312 may be connected in unity to the common line 350, such as metal patterns on the rear surface of the PCB 305, as shown with a dashed line in FIG. 3A, when the transformers 330 are arranged on the front surface of the PCB 305.

Figure 1A:
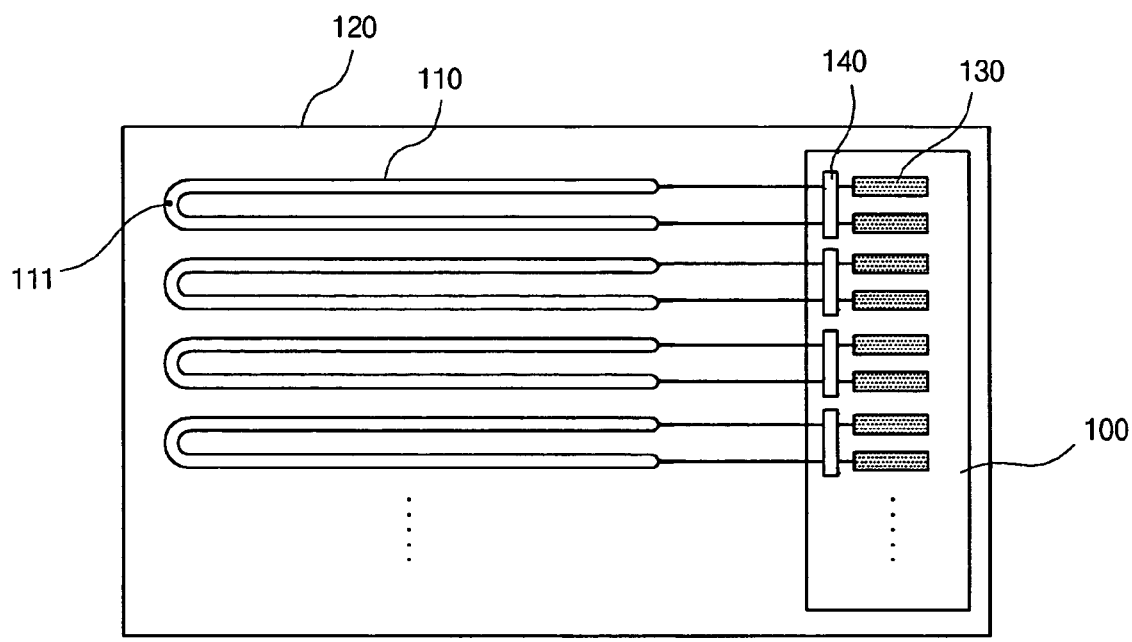
FIG. 1A is a schematic plan view of a direct type backlight assembly for the LCD device according to the related art.
Figure 1B:
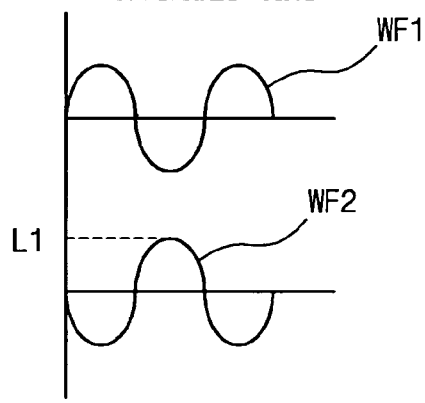
FIG. 1B is a waveform diagram of lamp driving voltages input to the U-shaped lamp of FIG. 1A.
Figure 2:
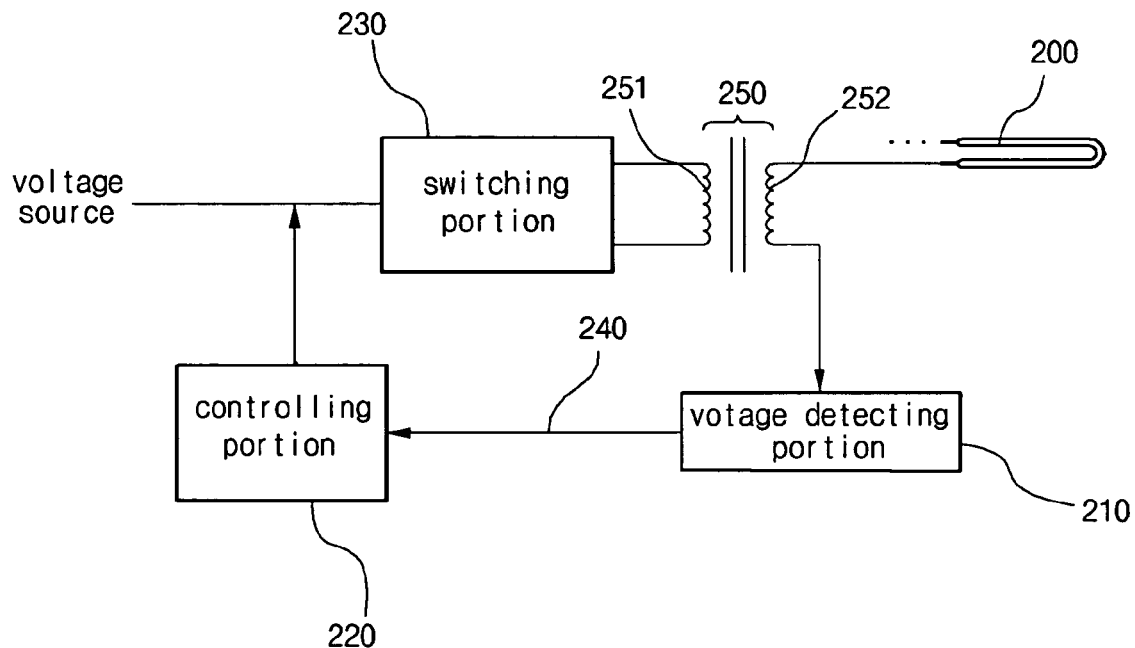
FIG. 2 is a schematic circuit diagram of a driving circuit for a transformer according to the related art.
Figure 3B:
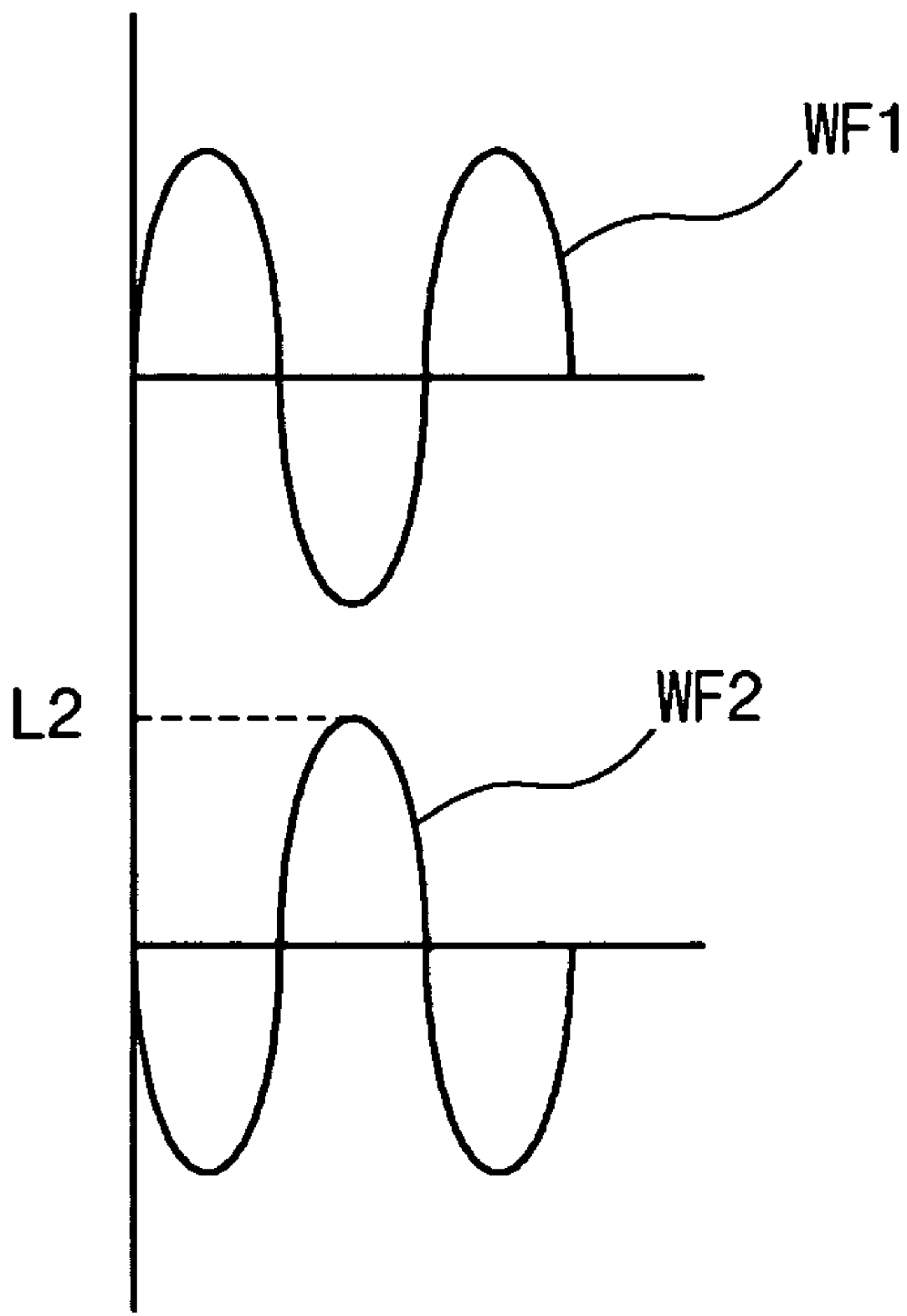
FIG. 3B is a waveform diagram of lamp driving voltages input to the U-shaped lamp of FIG. 3A.

FIG. 3B is a waveform diagram of lamp driving voltages input to the U-shaped lamp of FIG. 3A. As shown in FIG. 3B, first and second lamp driving voltages "WF1" and "WF2" are alternately output from the transformers 330 (of FIG. 3A) and supplied to the corresponding first electrodes 311 (of FIG. 3A). Since each U-shaped lamp 310 is supplied to one lamp driving voltage "WF1" or "WF2", the lamp driving voltage "WF1" or "WF2" has an amplitude "L2" two times greater than an amplitude "L1" (of FIG. 1B) of the related art lamp driving voltage. A wavelength and a phase of the lamp driving voltage "WF1" or "WF2" may coincide with a wavelength and a phase of the related art lamp driving voltage.

In the first exemplary embodiment, the second electrodes connected in unity to common line that may be grounded such that the U-shaped lamp is driven stably. However, the second electrodes are not grounded. As explained above, the backlight assembly of the first exemplary embodiment uses one transformer to drive each U-shaped lamp. Accordingly, the number of the transformers can be reduced by half comparing to the number of the related art transformers, and thus the number of the driving circuits for the transformers can be reduced.

Figure 4:
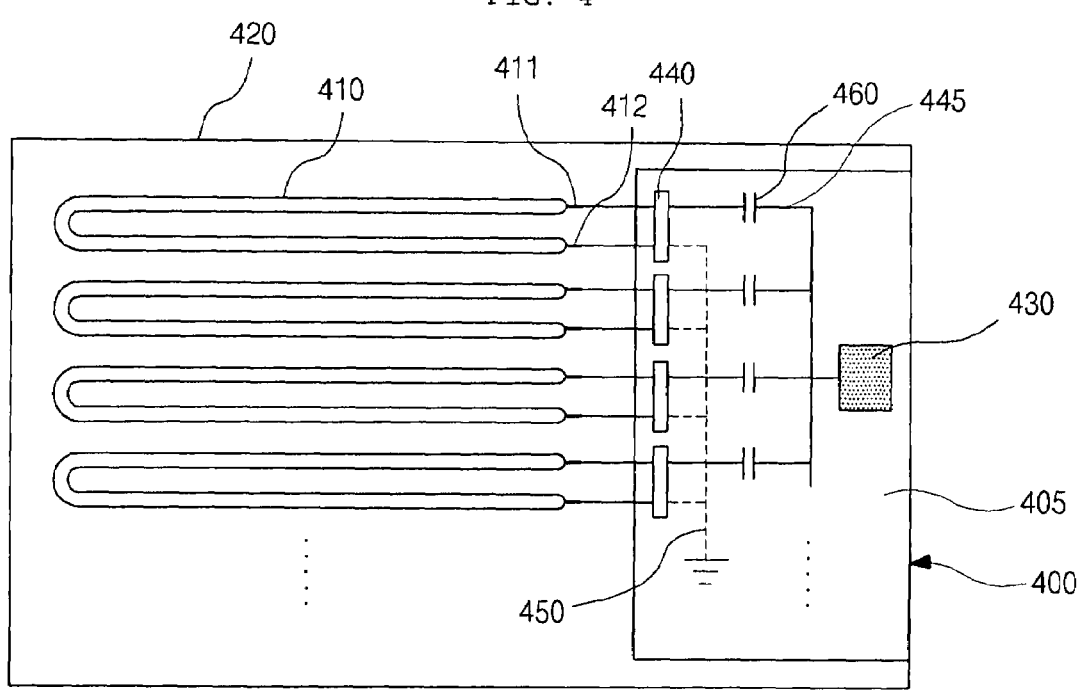
FIG. 4 is a schematic plan view of a direct type backlight assembly for the LCD device according to a second exemplary embodiment of the present invention.

FIG. 4 is a schematic plan view of a direct type backlight assembly for the LCD device according to a second exemplary embodiment of the present invention. Detailed explanations of parts similar to parts of the first exemplary embodiment will be omitted for the purpose of simplicity. As shown in FIG. 4, the backlight assembly includes a plurality of U-shaped lamps 410, a lamp housing 420 accommodating the U-shaped lamps 410 therein, and an inverter 400 supplying lamp driving voltages to the U-shaped lamps 410.

The inverter 400 includes a conversion circuit (not shown) converting a direct current (DC) voltage to an alternating current (AC) voltage, a transformer 430 boosting the converted AC voltage, and a plurality of output connectors 440 supplying the boosted AC voltage (i.e. lamp driving voltage) to the U-shaped lamps 410. The backlight assembly of the second exemplary embodiment uses one transformer 430 to supply lamp driving voltages to first electrodes 411 of the U-shaped lamps 410 through metal patterns 445 on the front surface of a PCB 405. Further, a plurality of capacitors 460 are connected between the transformer 430 and the U-shaped lamps 410. The capacitor 460 is used to prevent a phenomenon that a current flows on one of the U-shaped lamps 410 when turning on the U-shaped lamps 410. All of the second electrodes 412 are connected in unity to a ground terminal through a common line 450 such as metal patterns on the rear surface of the PCB 405, as shown with a dashed line of FIG. 4, in a similar manner as the interconnections of the second electrodes of the first exemplary embodiment.

As explained above, the backlight assembly of the second exemplary embodiment uses one transformer to drive all of the U-shaped lamps. However, the backlight assembly may use at least one transformer to drive at least two U-shaped lamps. In the backlight assembly of the second exemplary embodiment, the numbers of the transformers and the driving circuits can be reduced, and thus circuit structures thereof are simpler.

Figure 5A:
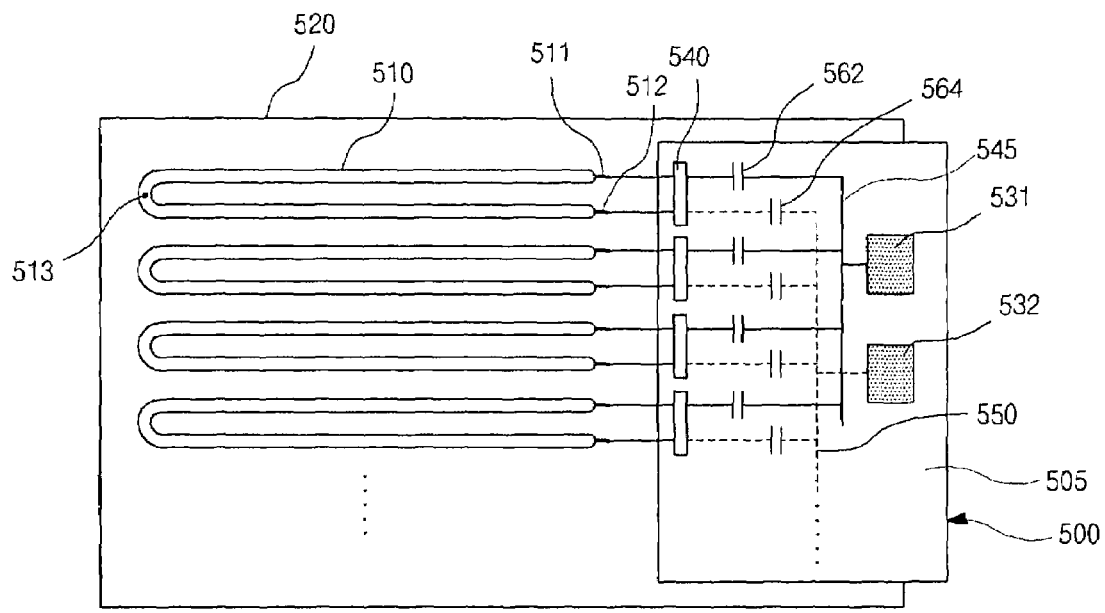
FIG. 5A is a schematic plan view of a direct type backlight assembly for the LCD device according to a third exemplary embodiment of the present invention.

FIG. 5A is a schematic plan view of a direct type backlight assembly for the LCD device according to a third exemplary embodiment of the present invention. Detailed explanations of parts similar to parts of the first and second exemplary embodiments will be omitted for the purpose of simplicity. As shown in FIG. 5A, the backlight assembly includes a plurality of U-shaped lamps 510, a lamp housing 520 accommodating the U-shaped lamps 510 therein, and an inverter 500 supplying lamp driving voltages to the U-shaped lamps 510.

The inverter 500 includes a conversion circuit (not shown) converting a direct current (DC) voltage to an alternating current (AC) voltage, first and second transformers 531 and 532 boosting the converted AC voltage, and a plurality of output connectors 540 supplying the boosted AC voltage (i.e. lamp driving voltage) to the U-shaped lamps 510. The backlight assembly of the third exemplary embodiment uses first and second transformers 531 and 532 respectively connected to first and second electrodes 511 and 512 of the U-shaped lamps 510. Accordingly, each U-shaped lamp 510 is driven by first and second lamp driving voltages output from the first and second transformers 531 and 532, respectively. The first and second lamp driving voltages have inverse phases, i.e., a phase difference by about 180 degrees.

A plurality of first capacitors 562 are connected between the first transformer 531 and the first electrodes 511 of the U-shaped lamps 510, and a plurality of second capacitors 564 are connected between the second transformer 532 and the second electrodes 512 of the U-shaped lamps 510. The capacitors 562 and 564 are used to prevent a phenomenon that a current flows on one of the U-shaped lamps 510 when turning on the U-shaped lamps 510.

All of the first electrodes 511 are connected in unity to the first transformer 531 through metal patterns 545 on the front surface of a PCB 505. All of the second electrodes 512 are connected in unity to the second transformer 532 through a common line 550 such as metal patterns on the rear surface of the PCB 505, as shown with a dashed line of FIG. 5A, in a similar manner to interconnections of the second electrodes of the first and second exemplary embodiments. Further, the second transformer 532 also may be arranged on the rear surface of the PCB 505 to prevent interference.

Figure 5B:
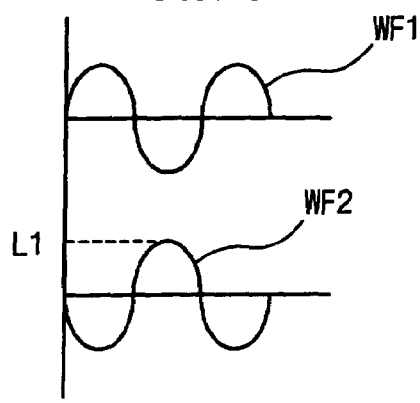
FIG. 5B is a waveform diagram of lamp driving voltages input to the U-shaped lamp of FIG. 5A.

FIG. 5B is a waveform diagram of lamp driving voltages input to the U-shaped lamp of FIG. 5A. As shown in FIG. 5B, first and second lamp driving voltages "WF1" and "WF2" having inverse phases are output from the first and second transformers 530 (of FIG. 5A) and supplied to the first and second electrodes 511 and 512 (of FIG. 5A). A center portion of each U-shaped lamp 510 acts as a virtual ground 513. Since each U-shaped lamp 510 (of FIG. 5A) is supplied to the two lamp driving voltages "WF1" and "WF2", the lamp driving voltage "WF1" or "WF2" may have an amplitude "L1" that is an half of an amplitude "L2" (of FIG. 3B) of the lamp driving voltage of the first exemplary embodiment. A wavelength and a phase of the lamp driving voltage "WF1" or "WF2" may coincide with a wavelength and a phase of the lamp driving voltage of the first exemplary embodiment.

As explained above, the backlight assembly of the third exemplary embodiment uses the two transformers to drive all the U-shaped lamps. However, the backlight assembly may use at least one first and second transformers to drive at least two U-shaped lamps. In the backlight assembly of the third exemplary embodiment, the numbers of the transformers and the driving circuits can be reduced, and circuit structures thereof can be simple.

In the above exemplary embodiments, the backlight assembly used for the LCD device is explained. However, the backlight assembly can also be used for other non-luminous display devices.

It will be apparent to those skilled in the art that various modifications and variations can be made in the backlight assembly for an LCD device of the present invention without departing from the spirit or scope of the invention. Thus, it is intended that the present invention cover the modifications and variations of this invention provided they come within the scope of the appended claims and their equivalents.

What is claimed is:

1. A backlight assembly for a display device, comprising:
a plurality of lamps supplying light to the display device, each lamp having first and second electrodes; and
an inverter including a plurality of transformers electrically connected to each of the plurality of lamps, a first number of the plurality of transformers is equal to or less than a second number of the plurality of lamps, wherein the inverter is formed in a printed circuit board (PCB) having first and second metal patterns on a front surface and a rear surface of the PCB, respectively, and wherein the first electrode of the lamp is connected to the first metal pattern and the second electrode of each lamp is connected to the second metal pattern.

2. The backlight assembly according to claim 1, wherein the first electrode of each lamp is electrically connected to each transformer.

3. The backlight assembly according to claim 1, wherein the second electrodes of the plurality of lamps are connected in unity.

4. The backlight assembly according to claim 1, wherein the second electrodes of the plurality of lamps are grounded.

5. The backlight assembly according to claim 1, wherein a total current flowing on the second electrodes of the plurality of the lamps is substantially zero.

6. The backlight assembly according to claim 1, wherein voltages output from adjacent transformers have phases inverse to each other.

7. The backlight assembly according to claim 1, wherein each lamp has a substantially U-shape.

8. The backlight assembly according to claim 1, wherein the display device is a liquid crystal display device.

9. A backlight assembly for a display device, comprising:
a plurality of lamps supplying light to the display device, each lamp having first and second electrodes; and
an inverter including a first transformer electrically connected to the plurality of lamps, wherein the inverter is formed in a printed circuit board (PCB) having first and second metal patterns on a front surface and a rear surface of the PCB, respectively, and wherein the first electrode of each lamp is connected to the first metal pattern and the second electrode of each lamp is connected to the second metal pattern.

10. The backlight assembly according to claim 9, further comprising a capacitor between the first transformer and the first electrode of each lamp.

11. The backlight assembly according to claim 9, wherein the second electrodes of the plurality of lamps are connected in unity.

12. The backlight assembly according to claim 9, wherein each lamp has a substantially U-shape.

13. The backlight assembly according to claim 9, wherein the display device is a liquid crystal display device.

14. The backlight assembly according to claim 9, wherein the first electrode of each lamp is connected to the first transformer.

15. The backlight assembly according to claim 14, wherein the inverter further includes a second transformer electrically connected to the second electrodes of the plurality of lamps.

16. The backlight assembly according to claim 15, further comprising a capacitor between the second transformer and the second electrode of each lamp.

17. The backlight assembly according to claim 15, wherein the first transformer is formed on the front surface and the second transformer is formed on the rear surface.

18. The backlight assembly according to claim 15, wherein a voltage output from the first transformer has a phase inverse to a voltage output from the second transformer.

19. A backlight assembly for a display device, comprising:
a plurality of lamps supplying light to the display device, each lamp having first and second electrodes; and
an inverter including at least one first transformer connected to the first electrodes of the plurality of lamps, a first number of the at least one first transformer is equal to or less than a second number of the plurality of lamps, wherein the inverter is formed in a printed circuit board (PCB) having first and second metal patterns on a front surface and a rear surface of the PCB, respectively, and wherein the first electrode of each lamp is connected to the first metal pattern and the second electrode of each lamp is connected to the second metal pattern.

20. The backlight assembly according to claim 19, wherein the inverter further includes at least one second transformer electrically connected to the second electrodes of the plurality of lamps, a third number of the at least one second transformer is equal to or less than the second number of the plurality of lamps.

21. The backlight assembly according to claim 19, wherein the second electrodes of the plurality of lamps are grounded.

\* \* \* \* \*